United States Patent
Yamazaki

(10) Patent No.: US 9,762,841 B2
(45) Date of Patent: Sep. 12, 2017

(54) SOLID STATE IMAGING DEVICE AND IMAGING SYSTEM

(71) Applicant: CANON KABUSHIKI KAISHA, Tokyo (JP)

(72) Inventor: Yoshikazu Yamazaki, Sagamihara (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/238,440

(22) Filed: Aug. 16, 2016

(65) Prior Publication Data

US 2017/0064225 A1    Mar. 2, 2017

(30) Foreign Application Priority Data

Sep. 1, 2015   (JP) ................................. 2015-171759

(51) Int. Cl.
   *H04N 5/378*   (2011.01)
   *H04N 5/357*   (2011.01)

(52) U.S. Cl.
   CPC ............. *H04N 5/378* (2013.01); *H04N 5/357* (2013.01)

(58) Field of Classification Search
   CPC ............................... H04N 5/378; H04N 5/357
   See application file for complete search history.

(56) References Cited

U.S. PATENT DOCUMENTS

| 6,002,287 | A | 12/1999 | Ueno | |
|---|---|---|---|---|
| 2016/0006967 | A1 | 1/2016 | Yamashita | |
| 2016/0035920 | A1* | 2/2016 | Tashiro | H04N 5/3575 |
| | | | | 250/208.1 |
| 2016/0150176 | A1* | 5/2016 | Hiyama | H04N 5/37457 |
| | | | | 348/301 |
| 2017/0154908 | A1* | 6/2017 | Tashiro | H01L 27/14605 |

FOREIGN PATENT DOCUMENTS

JP   11-27112   1/1999

* cited by examiner

*Primary Examiner* — Tuan Ho
(74) *Attorney, Agent, or Firm* — Fitzpatrick, Cella, Harper & Scinto

(57) ABSTRACT

A solid state imaging device includes a pixel unit; a signal line; a readout circuit that outputs, to the signal line, a first signal corresponding to a state where the pixel is reset and a second signal based on charges generated by photoelectric conversion in the photoelectric conversion element; a signal output circuit including an amplifier and a clamp capacitor, wherein a first terminal of the clamp capacitor is connected to the signal line and a second terminal of the clamp capacitor is connected to an input terminal of the amplifier; a correction circuit that outputs a correction signal that is based on a difference between an output signal of the amplifier and a reference signal; and a holding circuit configured to hold the correction signal and apply the correction signal to the input terminal of the amplifier when the first signal is output to the signal line.

20 Claims, 12 Drawing Sheets

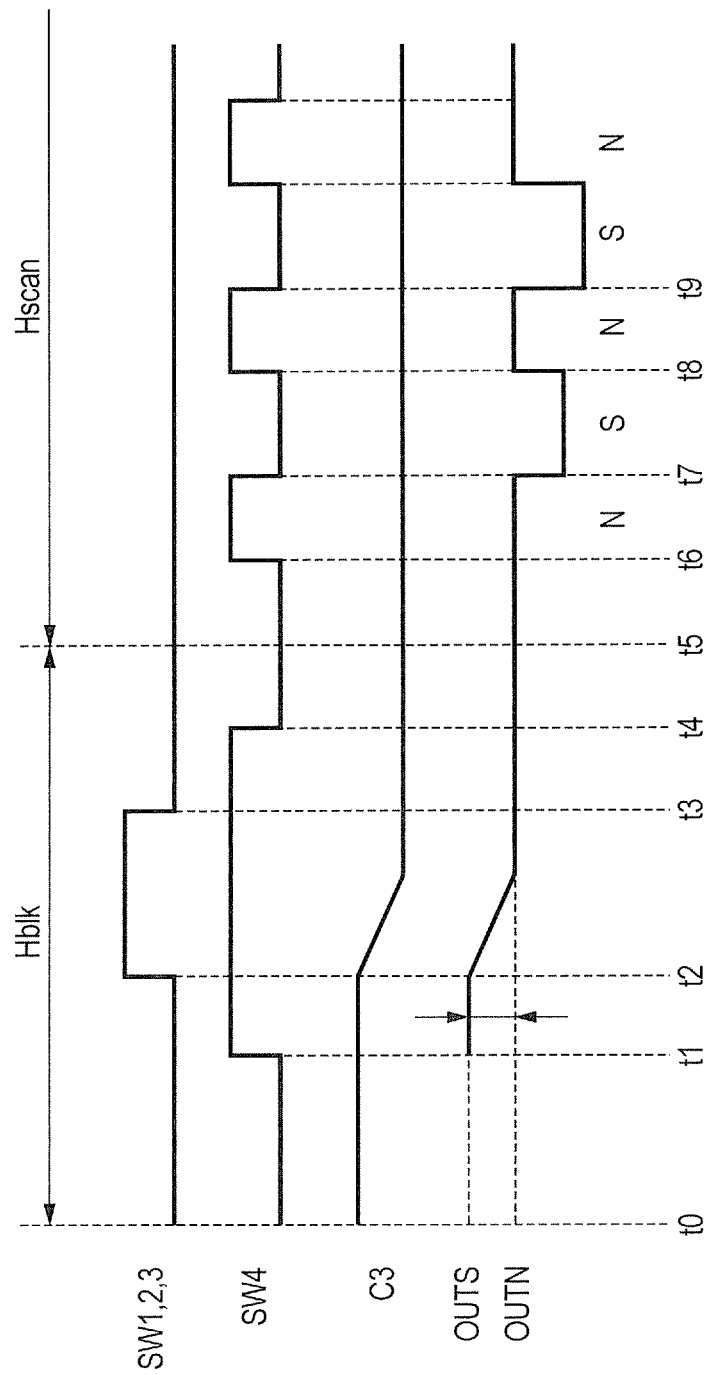

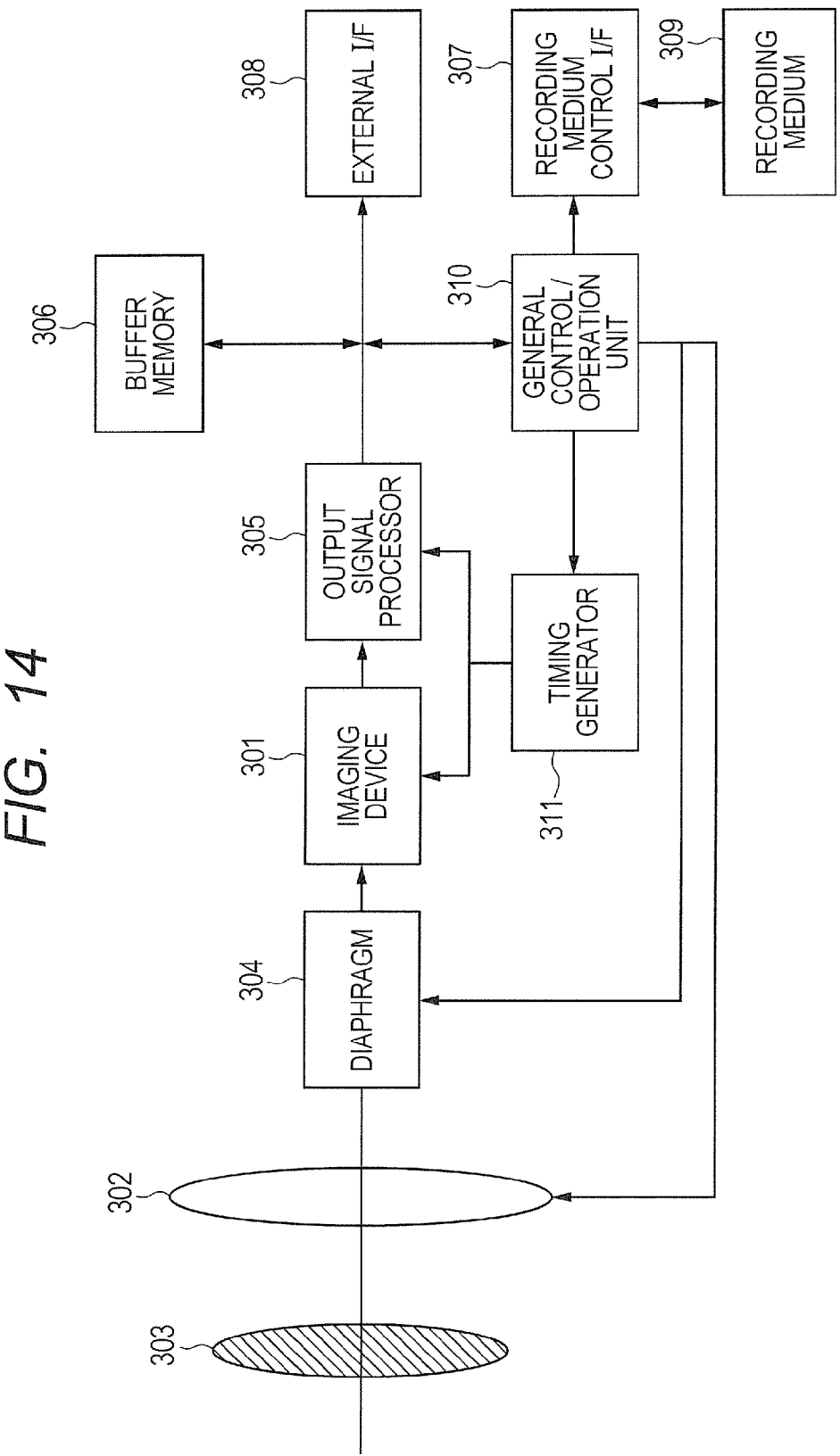

SOLID STATE IMAGING DEVICE AND IMAGING SYSTEM

BACKGROUND OF THE INVENTION

Field of the Invention

The present invention relates to a solid state imaging device and an imaging system.

Description of the Related Art

In recent years, as a demand for quality of images has become higher, devices that correct offset voltages of output signals have been proposed. An image reading device disclosed in Japanese Patent Application Laid-open No. H11-027112 has a multi-chip linear sensor and each chip has a correction circuit of an offset voltage. A correction circuit on a selected chip outputs a reference voltage and correction circuits on non-selected chips correct the offset voltages based on the reference voltage. This intends to reduce offset voltage differences on output signals of respective chips.

In the device described above, when there is an offset voltage in a correction circuit on a non-selected chip, the offset voltage is not corrected and remains, which may cause degradation of an image. Further, when a differential operation between an output signal from each chip and a reference voltage is performed in a signal processing circuit outside the chip, a dynamic range may be limited in the signal processing circuit due to an offset voltage. For example, when there is a voltage difference between a reference voltage and an output signal when no light is irradiated on a chip, this may limit the maximum use of the range of an input voltage of the signal processing circuit.

SUMMARY OF THE INVENTION

A solid state imaging device as one embodiment of the present invention includes: a pixel unit including a plurality of pixels arranged in a matrix, wherein each of the pixels includes a photoelectric conversion element; a signal line; a readout circuit that outputs, to the signal line, a first signal corresponding to a state where the pixel is reset and a second signal based on charges generated by photoelectric conversion in the photoelectric conversion element; a signal output circuit including an amplifier and a clamp capacitor, wherein a first terminal of the clamp capacitor is connected to the signal line and a second terminal of the clamp capacitor is connected to an input terminal of the amplifier; a correction circuit that outputs a correction signal based on a difference between an output signal of the amplifier and a reference signal; and a holding circuit configured to hold the correction signal and apply the correction signal to the input terminal of the amplifier when the first signal is output to the signal line.

A solid state imaging device as another embodiment of the present invention includes: a pixel unit including a plurality of pixels, wherein each of the pixels includes a photoelectric conversion element; a plurality of signal lines; a readout circuit that outputs a signal from the pixel to the plurality of signal lines; a plurality of signal output circuits each has an amplifier connected to corresponding one of the plurality of signal lines and configured to amplify a signal from the pixel; a correction circuit provided common to the plurality of signal output circuits so as to each generate a plurality of correction signals based on a difference between a reference signal and an output signal of the amplifier of one of the plurality of signal output circuits; and a plurality of holding circuits provided associated with the plurality of signal output circuits, each of the plurality of holding circuits configured to hold the correction signal and apply the correction signal to the input terminal of the associated amplifier.

Further features of the present invention will become apparent from the following description of exemplary embodiments with reference to the attached drawings.

BRIEF DESCRIPTION OF THE DRAWINGS

FIG. 2 is a timing chart of the solid state imaging device according to the first embodiment of the present invention.

FIG. 14 is a block diagram of an imaging system according to an eighth embodiment of the present invention.

DESCRIPTION OF THE EMBODIMENTS

Preferred embodiments of the present invention will now be described in detail in accordance with the accompanying drawings.

First Embodiment

Figure 1:
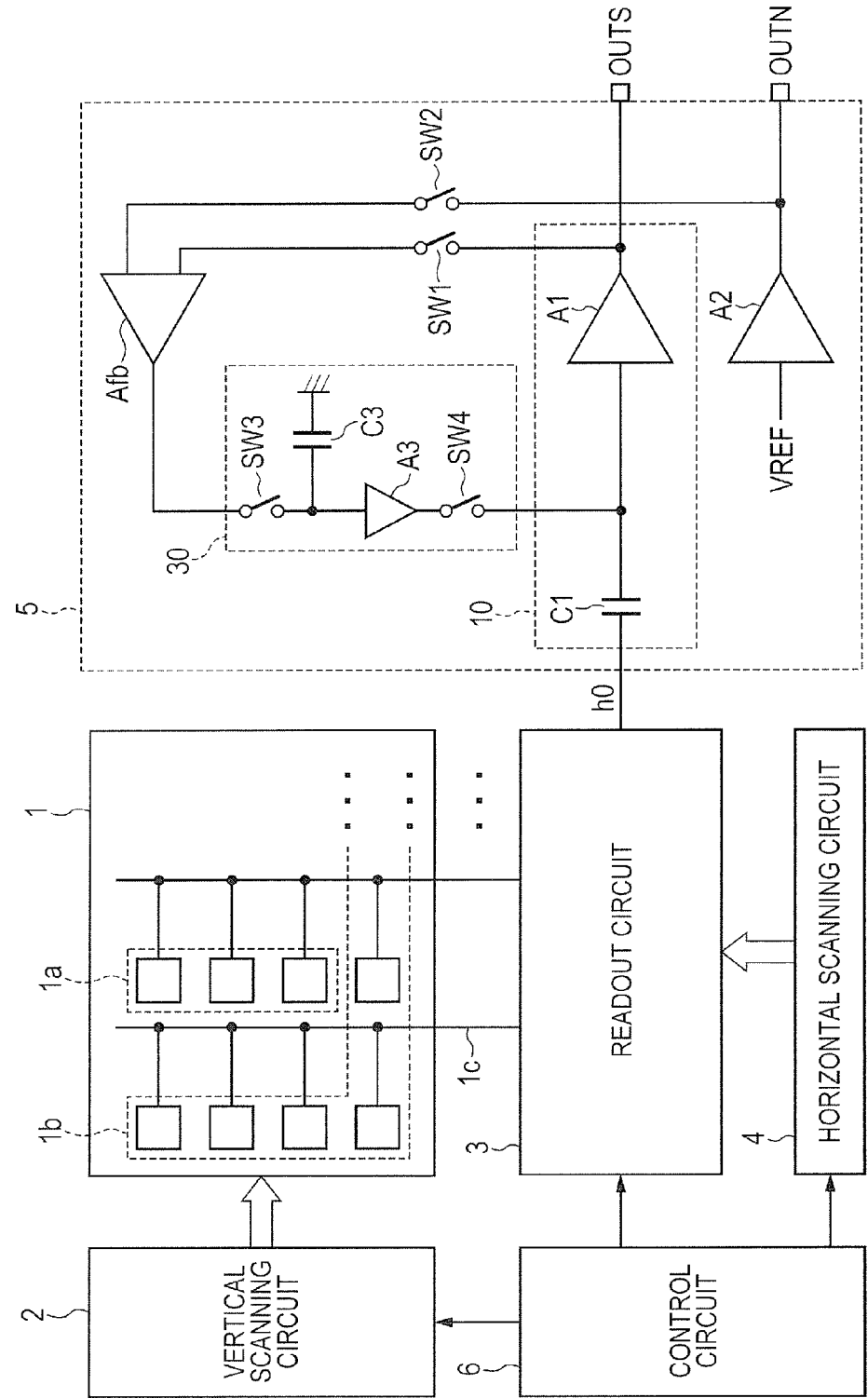
FIG. 1 is a block diagram of a solid state imaging device according to a first embodiment of the present invention.
Figure 6:
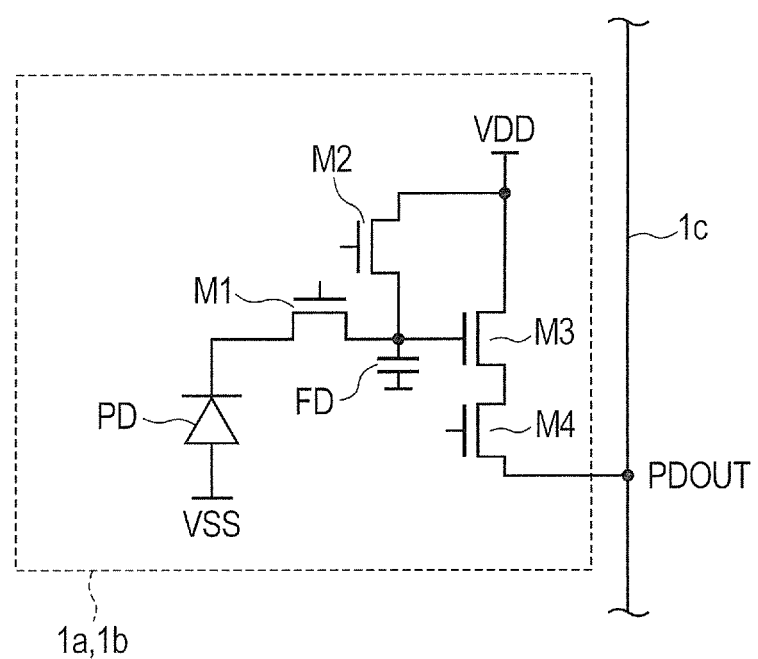
FIG. 6 is a diagram illustrating an example of a pixel circuit according to the first embodiment of the present invention.

FIG. 1 is a block diagram of a solid state imaging device according to the first embodiment of the present invention. The solid state imaging device is a CMOS image sensor having a pixel unit 1, a vertical scanning circuit 2, a readout circuit 3, a horizontal scanning circuit 4, an output circuit 5, and a control circuit 6. The pixel unit 1 includes a plurality of effective pixels 1a arranged in a matrix and a plurality of light shielded pixels (optical black pixels) 1b aligned around the effective pixels 1a. Each of the effective pixels 1a and the light shielded pixels 1b has a photoelectric conversion element PD, a transfer transistor M1, a reset transistor M2, an amplification transistor M3, a selection transistor M4, and a floating diffusion FD as illustrated in FIG. 6, for example. The photoelectric conversion element PD is formed of a photodiode, for example, and generates charges in accordance with an irradiated light. The transfer transistor M1 transfers charges generated in the photoelectric conversion element PD to the floating diffusion FD. The reset transistor M2 resets the potential of the floating diffusion FD to a predetermined voltage (a power supply voltage). In response to the transfer transistor M1 and the reset transistor M2 being simultaneously turned on, charges of the photoelectric conversion element PD are reset. The amplification transistor M3 operates as a source follower whose source potential varies depending on the potential of the floating diffusion FD. The selection transistor M4 connects the source of the amplification transistor M3 to a signal line 1c. In response to the selection transistor M4 on a row to be read out being turned on, a voltage in accordance with charges of the photoelectric conversion element PD on the same row is output to the signal line 1c. Although not depicted, a current circuit is connected to the signal line 1c. Each of the transistors M1 to M4 is not limited to an N-channel transistor and may be a P-channel MOS transistor. Further, a plurality of photoelectric conversion elements PDs may share a single amplification transistor M3.

A light shielding film is formed on the light shielded pixels 1b to block an incident light to the photoelectric conversion elements PDs. Further, a light shielding film may also be formed on a circuit portion other than the photoelectric conversion elements PDs of the effective pixel 1a. The photoelectric conversion element PD of the effective pixels 1a is provided with a color filter for controlling spectral sensitivity characteristics and a micro lens for converging a light. Further, light shielding films for preventing color mixture may be formed between respective photoelectric conversion units. Furthermore, a pixel that does not output an image such as a dummy pixel having no photoelectric conversion unit may be included in the pixel unit 1 in addition to the effective pixels 1a and the light shielded pixels 1b.

Turning back to FIG. 1, the vertical scanning circuit 2 performs readout scans of the pixel unit 1 in response to a signal from the control circuit 6. That is, the vertical scanning circuit 2 drives a control signal applied to the gates of the transistors M1 to M4 of the pixels 1a and 1b and reads out the pixels 1a and 1b on a row basis. The readout pixel signals are input to the readout circuit 3 via the signal lines 1c. The readout circuit 3 has column amplifier circuits on a signal line 1c basis, and amplifies pixel signals input via the signal lines 1c and outputs them to a signal line h0. The horizontal scanning circuit 4 has switches connected to the column amplifier circuits and supplies control signals for controlling turning on or off of the switches. The horizontal scanning circuit 4 sequentially turns on the switches and thereby a pixel signal on a selected row is output to the output circuit 5 via the signal line h0.

The output circuit 5 has a signal output circuit 10, a correction circuit Afb, a holding circuit 30, an amplifier A2, and switches SW1 and SW2. The signal output circuit 10 has an amplifier A1 and a clamp capacitor C1, and one end (a first terminal) of the clamp capacitor is connected to the signal line h0 and the other end (a second terminal) of the clamp capacitor is connected to an input terminal of the amplifier A1. That is, the signal line h0 is connected to the input terminal of the amplifier A1 via the clamp capacitor C1, and a signal is output from an output terminal OUTS of the amplifier A1. A reference signal VREF is input to an input terminal of the amplifier A2, and a signal based on the reference signal VREF is output from an output terminal OUTN. The reference signal VREF is a fixed voltage that does not depend on a signal from the photoelectric conversion element. While it is preferable for the amplifiers A1 and A2 to include a buffer amplifier that outputs a signal with a low impedance, the amplifiers A1 and A2 may include a voltage amplifier circuit. The amplifier A2 as the second amplifier has a configuration similar to the amplifier A1, and it is desirable for the amplifier A2 to have the substantially same electrical characteristics of the amplifier A1, such as the offset voltage, the amplification factor, and the like. The output terminals OUTS and OUTN are connected to a not-shown analog-front-end differential amplifier.

The correction circuit Afb has a pair of differential inputs, one input terminal is connected to the output terminal OUTS via the switch SW1, and the other input terminal is connected to the output terminal OUTN via the switch SW2. The correction circuit Afb amplifies a difference between an output signal and a reference signal to generate a correction signal.

The holding circuit 30 includes a switch SW3, a holding capacitor C3, and an amplifier A3. An output terminal of the correction circuit Afb is connected to the holding capacitor C3 via the switch SW3. That is, one end of the switch SW3 is connected to the output terminal of the correction circuit Afb, and the other end of the switch SW3 is connected to one end of the holding capacitor C3. The other end of the holding capacitor C3 is connected to a ground terminal that is a reference potential. Turning on of the switch SW3 enables the holding capacitor C3 to hold a correction signal output from the correction circuit Afb. One end of the holding capacitor C3 is connected to the input terminal of the single-input amplifier A3, and the output terminal of the amplifier A3 is connected to one end of the switch SW4. The other end of the switch SW4 is connected to the input terminal of the amplifier A1. In response to the switch SW4 being turned on, a correction signal is applied to the input terminal of the amplifier A1.

The amplifier A1, the correction circuit Afb, and the holding circuit 30 form a part of a negative feedback circuit (a feedback loop). The feedback loop is closed when all the switches SW1 to SW4 are turned on, and the feedback loop is opened when any of the switches SW1 to SW4 is turned off. The stability and/or the response speed of the negative feedback circuit can be adjusted by changing respective amplification factors of the amplifiers A1 and A3 and the correction circuit Afb. The switches SW1, SW2, SW3, and SW4 can be driven by the control circuit 6, for example. In order to correct the offset voltage of the signal output circuit 10, it is desirable that the offset voltage of the correction circuit Afb be as small as possible. Here, the offset voltage of the correction circuit Afb is assumed to be significantly small $\Delta v$.

FIG. 2 illustrates a timing chart of a solid state imaging device according to the present embodiment in which image signals are sequentially read out. Here, a period from the time when a pixel signal of the last column on a certain row of a frame has been read out to the time when a pixel signal of the first column on the next row is read out is referred to as a horizontal blanking period Hblk. A period for sequentially reading out pixel signals is referred to as a horizontal scanning period Hscan. The output circuit 5 corrects the level of an output signal of the amplifier A1 by outputting a correction signal during the horizontal blanking period Hblk to reduce the offset voltage of the amplifier A1 and the amplifier A2 (first correction). The holding circuit 30 holds a correction signal at the first correction in the holding capacitor C3. Then, during the horizontal scanning period Hscan, the output circuit 5 uses the held correction signal to correct the level of an output signal and sequentially outputs, from the output terminal OUTS, an N signal (first signal) in accordance with a reset state of the pixels 1a and 1b and an S signal (second signal) based on charges generated by a photoelectric conversion. The reset states of the pixels 1a and 1b are obtained by turning on the reset transistors M2 to reset the potentials of the floating diffusions FD.

The timing chart of FIG. 2 will be described in detail below. At time t0, the horizontal blanking period Hblk starts and, at this time, the switches SW1 to SW4 are in an off state. At time t1, the switch SW4 is turned on, and an initial voltage of the holding capacitor C3 is applied to the input terminal of the amplifier A1. Before this time, a voltage difference defined by the initial voltage of the holding capacitor C3 and the offset voltage of the amplifier A1 and the amplifier A2 has occurred between the output terminals OUTS and OUTN. Next, at time t2, the switches SW1, SW2, and SW3 are turned on and thereby a feedback loop extending from the output terminal OUTS of the amplifier A1 via the correction circuit Afb and the holding circuit 30 to the input terminal of the amplifier A1 is formed. The correction circuit Afb is input with respective voltages of the output terminal OUTS and the output terminal OUTN and outputs a correction signal based on a differential voltage between both voltages to the holding circuit 30. The holding circuit 30 holds a correction signal in the holding capacitor C3 and outputs it to the input terminal of the amplifier A1, that is, the other end of the clamp capacitor via the amplifier A3. The offset voltage can be reduced by inputting, as a negative feedback to the amplifier A1, a correction signal that is based on the offset voltage between the output terminals OUTS and OUTN. The offset voltage of each of the amplifiers A1 and A2 can also be corrected.

At time t3, the switches SW1, SW2, and SW3 are turned off and the feedback loop is opened. In this state, the voltage of the correction signal continues to be held in the holding capacitor C3. At time t4, the switch SW4 is turned off and the correction signal is no longer output to the other end of the clamp capacitor.

At time t5, the horizontal blanking period Hblk transfers to the horizontal scanning period Hscan. In the pixel 1a, the transfer transistor M1 and the reset transistor M2 are turned on and the potentials of the photoelectric conversion element PD and the floating diffusion FD are reset to a power supply voltage VDD. The selection transistor M4 is turned on, and the N signal based on the potential of the floating diffusion FD at the resetting is output to the signal line 1c, amplified by the readout circuit 3, and then output to the signal line h0. At time t6, the switch SW4 is turned on synchronized with a timing of the N signal being output from the signal line h0. The holding circuit 30 outputs the correction signal held during the horizontal blanking period Hblk to the input terminal of the amplifier A1 and clamps the voltage of the N signal to the voltage of the correction signal. This can eliminate or reduce a differential voltage between the output terminal OUTS and the output terminal OUTN when the N signal is output.

Next, in response to the reset transistor M2 being turned off and the transfer transistor M1 being turned on, charges by a photoelectric conversion are transferred from the photoelectric conversion element PD to the floating diffusion FD. The selection transistor M4 is turned on, and the S signal based on the charges at the photoelectric conversion is input to the readout circuit 3 via the signal 1c and output to the signal line h0. At time t7, the switch SW4 is turned off and the input terminal of the amplifier A1 is electrically disconnected from the holding circuit 30. When the S signal is input to the input terminal of the amplifier A1 via the clamp capacitor C1, the voltage of the input terminal changes by a voltage difference between the S signal and the N signal. That is, an (S−N) signal resulted by subtracting the N signal from the S signal is input to the input terminal of the amplifier A1. Thereby, a noise component due to characteristics variation among elements of the pixel unit 1 and the readout circuit 3 can be removed from the S signal. That is, a pixel signal without a fixed pattern noise can be output from the output terminals OUTS and OUTN.

Further, when the N signal is input (time t6 to t7), the input terminal of the amplifier A1 is clamped to the voltage of the correction signal. Thus, when the S signal is input (time t7 to t8), a change by a voltage difference between the S signal and the N signal with reference to the voltage of the correction signal occurs at the input terminal of the amplifier A1, and the (S−N) signal where the offset voltage has been removed is output from the amplifier A1.

At time t8, the N signal is output from the signal line h0 and the switch SW4 is turned on. The holding circuit 30 applies the correction signal to the input terminal of the amplifier A1 and thereby the offset voltage in the N signal is removed. At time t9, when the switch SW4 is turned off and the S signal is input to the input terminal of the amplifier A1, the signal output circuit 10 outputs a pixel signal in which the offset component in the (S−N) signal has been removed. In the subsequent periods until the horizontal scanning period Hscan ends, the same process is repeatedly performed.

According to the present embodiment, an offset voltage in a pixel signal can be removed and an offset voltage of the N signal can be reduced to a significantly small voltage $\Delta v$. When an input circuit of an image signal processor outside the output circuit 5 is formed of a differential amplifier, the input voltage range of the image signal processor can be used at the maximum, which allows for an increased dynamic range of a pixel signal.

It is here assumed that the offset voltage of the amplifier A1 is Voffs, the offset voltage of the amplifier A2 is Voffn, and the offset voltage of the correction circuit Afb is $\Delta v$. When no offset correction is performed, respective voltages and a differential voltage at the output terminals OUTS and OUTN when the reference signal VREF is output are as follows.

$$OUTS=VREF+Voffs$$

$$OUTN=VREF+Voffn$$

$$OUTS-OUTN=Voffs-Voffn$$

In the present embodiment, respective voltages and a differential voltage at the output terminals OUTS and OUTN when the reference signal VREF is output are as follows.

$$OUTS=VREF+Voffn+\Delta v$$

$$OUTN=VREF+Voffn$$

$$OUTS-OUTN=\Delta v$$

In the above equations, it can be seen that a differential voltage when no offset correction is performed is Voffs−Voffn and a differential voltage when an offset correction is performed is significantly small $\Delta v$. In general, since high-speed amplifiers have a large offset voltage, the offset of the differential output will be |Voffs−Voffn|≫$\Delta v$. Therefore, when the amplifiers A1 and A2 having large offset voltages are required to used in the output circuit 5 due to a design specification, for example, the advantages of the present embodiment will be remarkably effective.

Figure 3A:
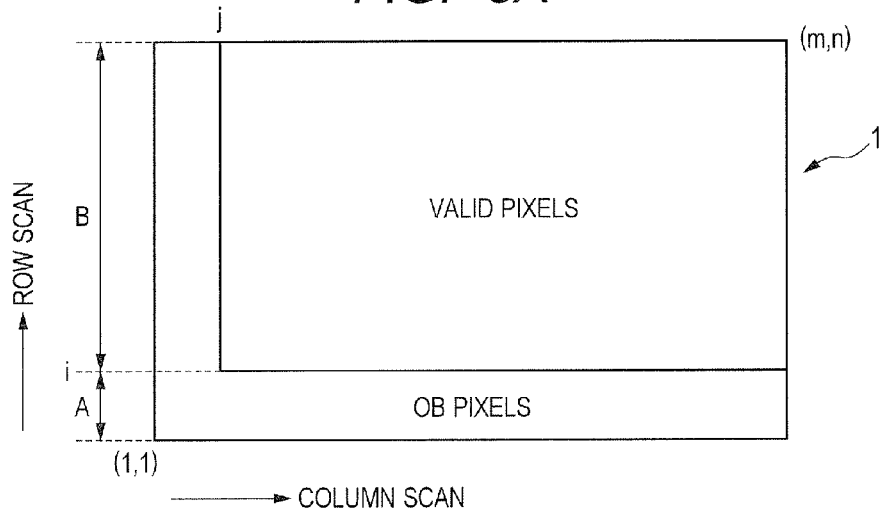
FIG. 3A, FIG. 3B and FIG. 3C are diagrams for illustrating a pixel unit and a correction process of the solid state imaging device according to the first embodiment of the present invention.
Figure 3B:
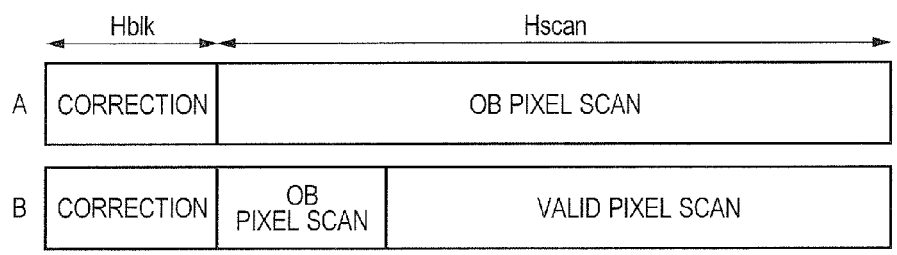
Figure 3C:
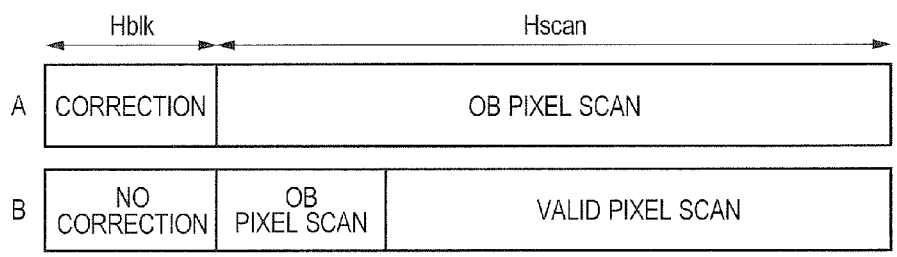

FIG. 3A to FIG. 3C are diagrams illustrating a pixel unit and a correction process of the solid state imaging device according to the present embodiment. In FIG. 3A, the pixel unit 1 is formed of pixels of m rows by n columns and includes an effective pixel area formed of a plurality of effective pixels and a light shielded pixel area formed of a plurality of light shielded pixels (referred as "OB pixels" in the drawings). Row scans are performed from the first row to the m-th row of the pixel unit 1, and column scans are performed from the first column to the n-th column. The first row to the i-th row are denoted as A row, and the (i+1)-th row to the m-th row are denoted as B row. The A row is a light shielded pixel row consisting of the light shielded pixels 1b only, and the B row is formed of light shielded pixels from the first column to the j-th column and effective pixels from the (j+1)-th column to the n-th column.

As illustrated in FIG. 3B, after readout scans of the A row, readout scans of the B row are performed. The output circuit 5 performs an offset correction during the blanking period Hblk of the A row and outputs signals from the light shielded pixels during a horizontal scanning period Hscan. Subsequently, the output circuit 5 performs an offset correction during the blanking period Hblk of the B row and sequentially outputs signals from the light shielded pixels and the effective pixels subjected to column scans during the horizontal scanning period Hscan. Since a correction signal is held in the holding capacitor C3 for every horizontal blanking period Hblk, variation of the correction signal can be suppressed to the minimum during the horizontal scanning period Hscan. Therefore, even when the voltage value of the holding capacitor C3 may vary due to leakage or the like, shading in the row direction can be suppressed to obtain a stable image signal.

As illustrated in FIG. 3C, the offset correction may be performed only during the horizontal blanking period Hblk of the A row. During the blanking period Hblk of the A row, the output circuit 5 outputs signals from the light shielded pixels subjected to column scans during the horizontal scanning period Hscan after performing an offset correction. For the B row, the output circuit 5 sequentially outputs signals from the light shielded pixels and the effective pixels without performing an offset correction. Since a correction signal is held at a constant level during a readout period of the effective pixel area, stable image signals without horizontal stripe noise can be obtained in the effective pixel area.

As described above, in the present embodiment, when a pixel signal and a reference signal VREF are output from the solid state imaging device, the offset voltage between the pixel signal and the reference signal VREF can be eliminated or reduced. This allows for the maximum use of the range of an input voltage of a differential amplifier in a post-stage signal processing circuit. Further, it is no longer necessary to perform an offset correction in the signal processing circuit, which can reduce processing load in the signal processing circuit. Moreover, according to the present embodiment, a correlated double sampling (CDS) process can be performed by clamping the voltage of a clamp capacitor to a voltage that is based on the N signal, and a pixel signal in which a noise component has been removed can be obtained.

Second Embodiment

Figure 4A:
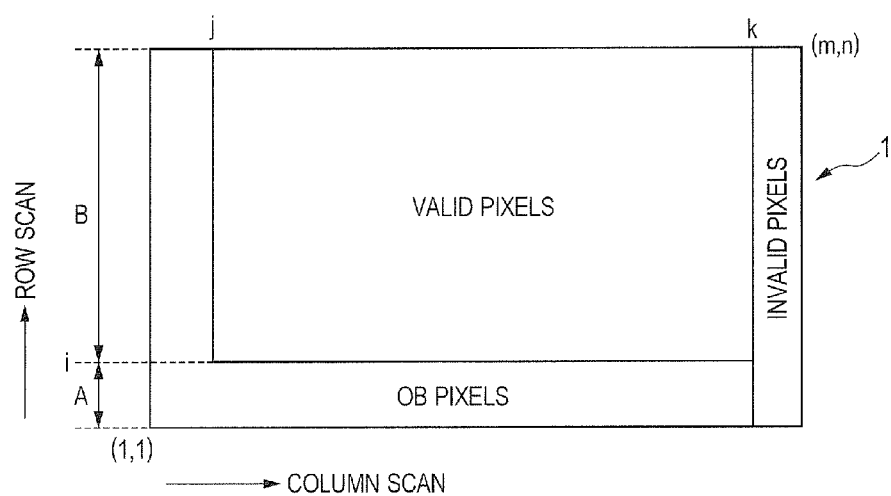
FIG. 4A and FIG. 4B are diagrams for illustrating a pixel unit and a correction process of a solid state imaging device according to a second embodiment of the present invention.
Figure 4B:
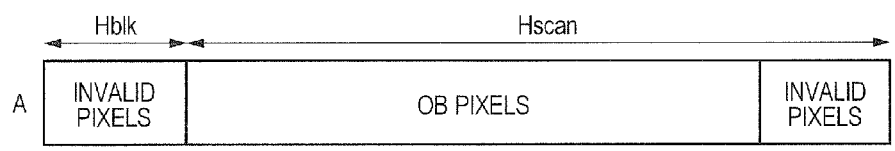

FIG. 4A and FIG. 4B are diagrams for illustrating a pixel unit and a correction process of a solid state imaging device according to the second embodiment. The pixel unit 1 according to the present embodiment has an invalid pixel area adjacent to the effective pixel area, and the output circuit 5 performs an offset correction based on the pixel signal from any one of the invalid pixels of the invalid pixel area. In the following, features that are different from those in the first embodiment will be mainly described.

In FIG. 4A, the pixel unit 1 is formed of pixels of m rows by n columns and includes the A row from the first row to the i-th row and the B row from the (i+1)-th row to the m-th row. The A row includes a light shielded pixel area from the first column to the k-th column and an invalid pixel area from the (k+1)-th column to the n-th column. The B row includes a light shielded pixel area from the first column to the j-th column, an effective pixel area from the (j+1)-th column to the k-th column, and an invalid pixel area from the (k+1)-th column to the n-th column. The invalid pixel area may include NULL pixels that have no photoelectric conversion element.

As illustrated in FIG. 4B, during the blanking period Hblk of the A row, the readout circuit 3 reads out a pixel signal of any one of the invalid pixels from the invalid pixel area, and the holding circuit 30 outputs a correction signal based on the read-out pixel signal to the signal output circuit 10. Thereby, the voltage of the clamp capacitor C1 is fixed to the voltage of the correction signal. This voltage is substantially the same as the voltage of the correction signal that is based on the N signal read out after the end of the blanking period Hblk. This can reduce the time required until the voltage becomes stable, when readout of a pixel signal is started in the horizontal scanning period Hscan. Note that, in order that the voltage of the signal line h0 does not vary while an offset correction is being performed, it is desirable that the terminal of the clamp capacitor C1 in the side of the readout circuit 3, that is, the signal line h0 be in a low impedance state. In the horizontal scanning period Hscan of the A row, the output circuit 5 sequentially outputs signals from the light shielded pixels and the invalid pixels. Although not depicted, also during the blanking period Hblk of the B row, the output circuit 5 performs an offset correction based on any one of the pixel signals of the invalid pixel area. During the horizontal scanning period Hscan of the B row, the output circuit 5 sequentially outputs signals from the effective pixels and the invalid pixels. The present embodiment also allows for the same advantages as those in the first embodiment.

Third Embodiment

Figure 5:
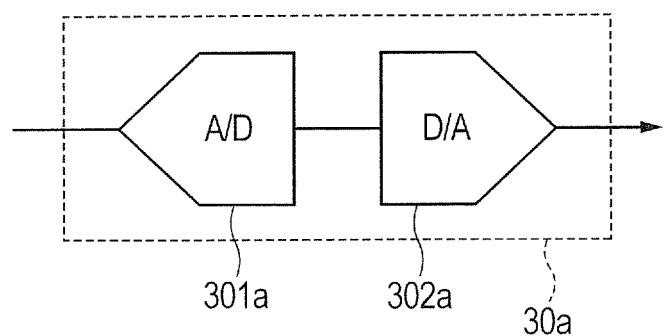
FIG. 5 is a block diagram of a holding circuit according to a third embodiment of the present invention.

While a correction signal is an analog signal in the first and second embodiments described above, the correction signal may be converted into a digital signal. FIG. 5 is a block diagram of a holding circuit 30a according to the third embodiment. In the following, features that are different from those in the first embodiment will be mainly described. The holding circuit 30a includes an A/D convertor 301a and D/A convertor 302a. The A/D convertor 301a converts a correction signal from the correction circuit Afb into a digital signal and holds the digital signal. The D/A convertor 302a converts a held digital signal into an analog signal and outputs the analog signal as a correction signal for an offset correction.

Note that, when the output circuit 5 includes a plurality of the signal output circuits 10, a memory for holding a digital signal from the A/D convertor 301a and the D/A convertor 302a may be provided to each of the signal output circuits 10 to perform an offset correction in each of the signal output circuits 10. In FIG. 1, although a pixel signal is output to a single signal line h0 from the readout circuit 3, a plurality of signal lines h0 may be sequentially selected during the horizontal scanning period Hscan for output from the amplifier A1. For example, a selection switch may be provided to select any one of two signal lines h0 and output a signal to the clamp capacitor C1. In the present embodiment, variation of a correction signal due to leakage of the holding capacitor or the like can be avoided by holding the correction signal as a digital signal.

Fourth Embodiment

Figure 7:
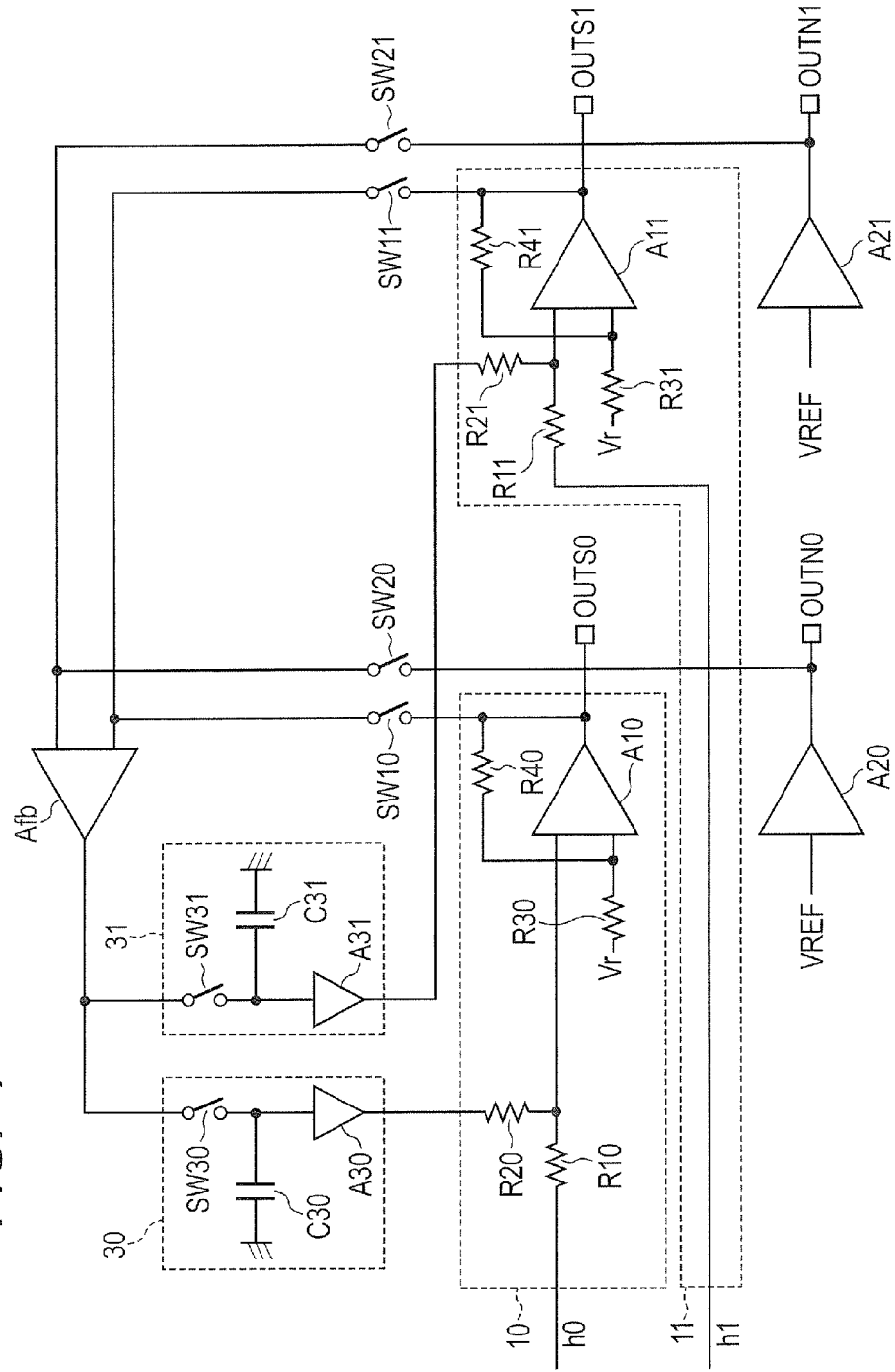
FIG. 7 is a block diagram of an output circuit according to a fourth embodiment of the present invention.

FIG. 7 is a block diagram of the output circuit 5 according to the fourth embodiment of the present invention. The output circuit 5 according to the present embodiment includes a correction circuit Afb common to a plurality of signal output circuits 10 and 11. Further, unlike the first embodiment, the signal output circuits 10 and 11 have no clamp capacitor. In the following, features that are different from those in the first embodiment will be mainly described.

The output circuit 5 includes signal output circuits 10 and 11, the correction circuit Afb, holding circuits 30 and 31, amplifiers A20 and A21, and switches SW10, SW11, SW20, and SW21. The signal output circuit 10 includes an amplifier A10 and resistors R10, R20, R30, and R40 to form a non-inverting amplifier circuit. The signal output circuit 10 is input with a signal from the signal line h0, and the signal output circuit 11 is input with a signal from the signal line h1. In the present embodiment, pixel signals that have been subjected to a correlated double sampling process are output from the signal lines h0 and h1.

The signal line h0 is connected to the non-inverting input terminal of the amplifier A10 via the resistor R10, and the non-inverting input terminal is further connected to the holding circuit 30 via the resistor R20. The output terminal and the inverting input terminal of the amplifier A10 are connected via the feedback resistor R40, and further a reference signal Vr is applied to the inverting input terminal via the resistor R30. The amplifier A10 amplifies a pixel signal on the signal line h0 and outputs the amplified signal from the output terminal OUTS0. A signal based on the reference signal VREF is output to the output terminal OUTN0 from the amplifier A20, and the output terminals OUTS0 and OUTN0 form differential output terminals.

In the same manner, the signal output circuit 11 includes an amplifier A11 and resistors R11, R21, R31, and R41 to form a non-inverting amplifier circuit. It is desirable that the resistors R11, R21, R31, and R41 have the same resistances as the resistors R10, R20, R30, and R40, respectively. The amplifier A11 amplifies a signal from the signal line h1 and outputs the amplified signal from the output terminal OUTS1. A signal based on the reference signal VREF is output to the output terminal OUTN1 from the amplifier A21, and the output terminals OUTS1 and OUTN1 form differential output terminals.

The correction circuit Afb includes a pair of differential inputs, one of the input terminals is connected to the output terminals OUTS0 and OUTS1 of the amplifiers A10 and A11 via the switches SW10 and SW11, respectively. Further, the other input terminal of the correction circuit Afb is connected to the output terminals OUTN0 and OUTN1 of the amplifiers A20 and A21 via the switches SW20 and SW21, respectively. That is, the correction circuit Afb can be selectively input with a differential voltage between the output terminals OUTS0 and OUTN0 or a differential voltage between the output terminals OUTS1 and OUTN1. The output terminal of the correction circuit Afb is connected to the holding circuits 30 and 31.

The holding circuit 30 includes a switch SW30, a holding capacitor C30, and an amplifier A30, and the holding circuit 31 includes a switch SW31, a holding capacitor C31, and an amplifier A31. With the switches SW30 or SW31 being selectively turned on, a correction signal from the correction circuit Afb is held in either one of the holding capacitors C30 and C31. The output terminal of the amplifier A30 of the holding circuit 30 is connected to the non-inverting input terminal of the amplifier A10 via the resistor R20. In the same manner, the output terminal of the amplifier A31 of the holding circuit 31 is connected to the non-inverting input terminal of the amplifier A11 via the resistor R21. In such a way, with feedback of a correction signal from the shared correction circuit Afb to the signal output circuits 10 and 11, respectively, it is possible to prevent offset corrections from being different among output channels.

Figure 8:
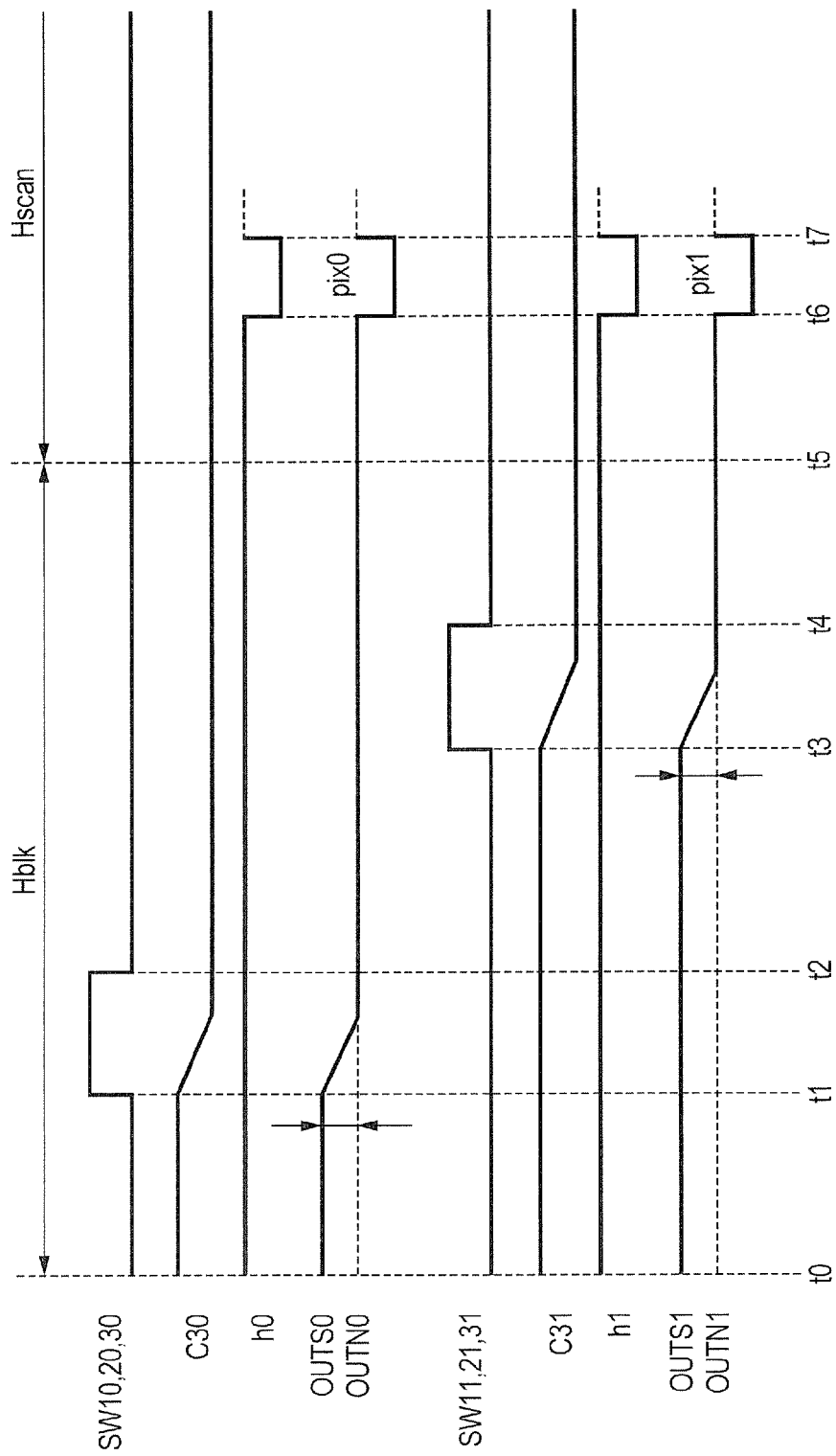
FIG. 8 is a timing chart of a solid state imaging device according to the fourth embodiment of the present invention.

FIG. 8 is a timing chart of the solid state imaging device according to the present embodiment, in which pixel signals are sequentially read out. During the horizontal blanking period Hblk, the output circuit 5 performs respective corrections for the offset voltage between the amplifier A10 and the amplifier A20 and the offset voltage between the amplifier A11 and the amplifier A21 (first correction). During horizontal scanning period Hscan, the output circuit 5 uses held correction signals to sequentially output pixel signals from the output terminals OUTS0 and OUTS1 (second correction). Although the N signal and the S signal are sequentially read out from the signal line h0 in the first embodiment, pixel signals resulted by applying a correlated double sampling process to the N signal and the S signal are read out from the signal lines h0 and h1 in the present embodiment.

The timing chart of FIG. 8 will be described in detail below. At time t0, the horizontal blanking period Hblk starts and, at this time, the switches SW10, SW20, SW30, SW11, SW21, and SW31 are in an off state. At time t1, the switches SW10, SW20, and SW30 are turned on and a feedback loop extending from the output terminal OUTS0 of the amplifier A10 via the correction circuit Afb, the holding circuit 30, and the non-inverting input terminal of the amplifier A10 is closed. That is, the correction circuit Afb amplifies a differential voltage between the output terminals OUTS0 and OUTN0 to output a correction signal. The correction signal is held in the holding capacitor C30 via the switch SW30 and applied to the non-inverting input terminal of the amplifier A10 from the amplifier A30 via the resistor R20. The holding circuit 30 feeds the correction signal back to the non-inverting input terminal of the amplifier A10 via the resistor R20 to correct the level of the output signal of the amplifier A10. The voltage at the output terminal OUTS0 corresponds to the reference signal VREF, which can eliminate or reduce the offset voltage between the output terminals OUTS0 and OUTN0. At time t2, the switches SW10, SW20, and SW30 are turned off and the feedback loop is opened. That is, the input and output terminals of the correction circuit Afb are electrically disconnected from the amplifier A10 and the holding circuit 30. Even after the switch SW30 is turned off, the voltage of the correction signal is still held in the holding capacitor C30 and the correction signal continues to be applied to the non-inverting input terminal of the amplifier A10.

In this example, the resistors R20 and R40 each have a resistance of Rf and the resistors R10 and R30 each have a resistance of Rs. Further, the voltage of the signal line h0 is Vh0, and the voltage of a correction signal from the amplifier A30 is Vfb0. In this case, the voltage VOUTS0 of the output terminal OUTS0 is expressed by the following equation.

$$VOUTS0=(Vh0-Vr)\times Rf/Rs+Vfb0$$

The holding circuit 30 can correct the offset voltage of the output terminal OUTS0 and, at the same time, correct the offset voltage of the amplifiers A10 and A20 by outputting a correction signal to the signal output circuit 10.

At time t3, the switches SW11, SW21, and SW31 are turned on and a feedback loop extending from the output terminal OUTS1 of the amplifier A11 via the correction circuit Afb and the holding circuit 31 to the non-inverting input terminal of the amplifier A11 is closed. The holding circuit 31 feeds a correction signal based on the differential voltage between the output terminals OUTS1 and OUTN1 back to the amplifier A11 to correct the level of the output signal. At this time, the offset voltage of the amplifiers A11 and A21 can be corrected simultaneously. At time t4, the switches SW11, SW21, and SW31 are turned off, the feedback loop is opened, and the offset correction is completed. The voltage of the correction signals are held in the holding capacitors C30 and C31 and the correction signals continue to be applied to the amplifiers A10 and A11.

At time t5, the horizontal blanking period Hblk transfers to the horizontal scanning period Hscan. The readout circuit 3 reads out and holds the N signal that is based on charges at the time of resetting of the photoelectric conversion element PD. Next, the readout circuit 3 reads out the S signal that is based on charges at the time of a photoelectric conversion. During time t6 to t7, the readout circuit 3 performs a correlated double sampling process on the S signal and the N signal to output pixel signals in which the N signal has been subtracted from the S signal to the signal lines h0 and h1, respectively. The signal output circuits 10 and 11 amplify pixel signals and output the amplified pixel signals from the output terminals OUTS0 and OUTS1.

In the present embodiment, since two lines of the signal output circuits 10 and 11 are provided, two different pixel signals can be simultaneously output to allow for a faster readout operation. The offset voltage between the output terminals OUTS0 and OUTN0 and the offset voltage between the output terminals OUTS1 and OUTN1 can be reduced to the significantly small offset voltage Δv of the correction circuit Afb. In the present embodiment, with the use of the correction circuit Afb common to the plurality of signal output circuits 10 and 11 to perform offset corrections, offset voltages of a plurality of signal output circuits such as the signal output circuits 10 and 11 can be uniformized to the same offset voltage Δv. That is, variation in the offset corrections among multi-channel output lines can be eliminated. The present embodiment is much preferable in a system that multiplexes signals from the output terminals OUTS0 and OUTN0 and signals from the output terminals OUTS1 and OUTN1 and receives the multiplexed signal by the same AD convertor.

Circuit gains of the signal output circuits 10 and 11 are determined by the resistors R10, R20, R30, and R40 and the resistors R11, R21, R31, and R41, and any amplification factor may be set. Note that, since the voltage of the non-inverting input terminals of the amplifiers A10 and A11 are determined by the ratio of the resistors R10 and R20 and the ratio of the resistors R11 and R21, respectively, the output impedance of the readout circuit 3 connected to the resistors R10 and R11 may affect the circuit gains of the signal output circuits 10 and 11. Therefore, it is preferable to provide a buffer circuit or a gain amplifier on a column basis to the readout circuit 3 to drive the signal lines h0 and h1 with a low impedance.

Fifth Embodiment

Although FIG. 7 according to the fourth embodiment described above illustrates two signal output circuits 10 and 11, the number of the signal output circuits is not limited thereto. The solid state imaging device according to the present embodiment may have eight channels of output lines and may include first to eighth signal output circuits, first to eighth holding circuits, and a shared correction circuit Afb. In this case, the first to eighth holding circuits includes first to eighth switches. The correction circuit Afb corrects the level of the output signal in a selected pair of signal output circuit and holding circuit.

Figure 9:
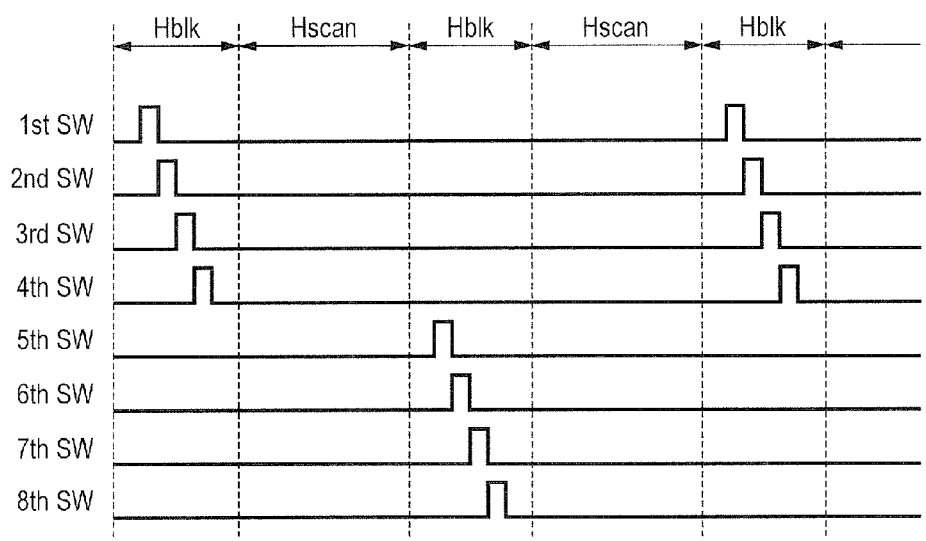
FIG. 9 is a timing chart of a solid state imaging device according to a fifth embodiment of the present invention.

FIG. 9 is a timing chart of the solid state imaging device according to the present embodiment. In the present embodiment, offset corrections of four channels of output lines are performed during the first horizontal blanking period Hblk and offset corrections of remaining four channels of output lines are performed during the second horizontal blanking period Hblk. During the first horizontal blanking period Hblk, the first switch of the first holding circuit is turned on, and a correction signal is output from the correction circuit Afb to the first holding circuit. The first holding circuit outputs a correction signal to the first signal output circuit to perform an offset correction of the output terminals OUTS0 and OUTN0. After the first switch is turned off, the second switch is turned on and the second holding circuit outputs a correction signal to the second signal output circuit to perform an offset correction of the output terminals OUTS1 and OUTN1. In the same manner, the third switch and then the fourth switch are turned on, and the third holding circuit and then the fourth holding circuit perform offset corrections of the third and fourth signal output circuits, respectively. Also during the horizontal scanning period Hscan, the first to fourth holding circuits continue to output held correction signals to the first to fourth signal output circuits.

During the second horizontal blanking period Hblk, the fifth to eighth switches are sequentially turned on, and the fifth to eighth holding circuits perform offset corrections of the fifth to eighth signal output circuits. Furthermore, during the third horizontal blanking period Hblk, the first to fourth switches are sequentially turned on, and the first to fourth holding circuits perform offset corrections of the first to fourth signal output circuits. In the same manner for subsequent periods, offset corrections of four signal output circuits are performed every two horizontal blanking periods Hblk. In FIG. 9, the frequency of the offset corrections can be increased compared to the timing chart of FIG. 10 described later. Therefore, even when the voltage of the holding capacitor is likely to vary due to leakage or the like, stable image signals without shading in the row direction can be obtained.

Figure 10:
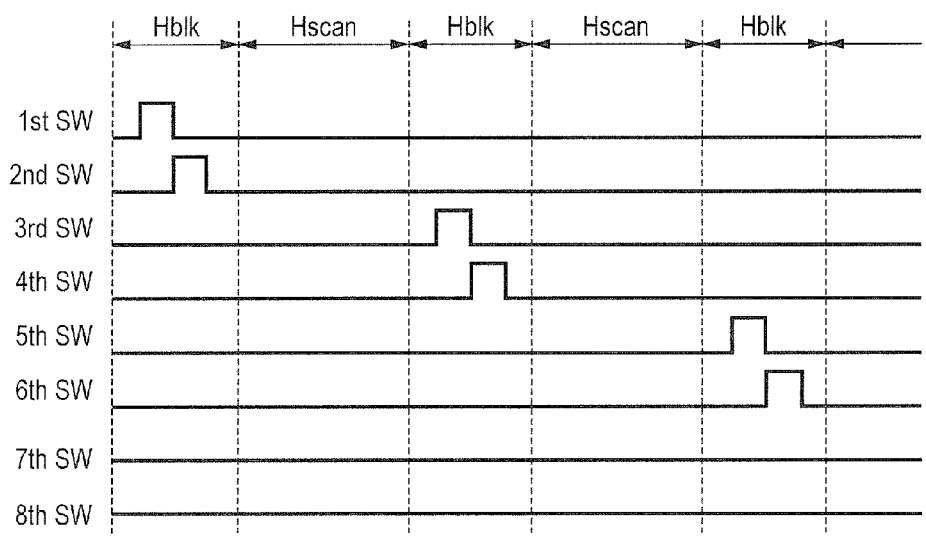
FIG. 10 is another example of a timing chart of the solid state imaging device according to the fifth embodiment of the present invention.

FIG. 10 illustrates another example of the timing chart of the solid state imaging device according to the present embodiment. In this example, offset corrections of two channels of output lines are performed every horizontal blanking period Hblk and therefore offset corrections of eight channels of output lines in total are performed by four horizontal blanking periods Hblk. That is, the first and second holding circuits perform offset corrections of the first and second signal output circuits during the first horizontal blanking period Hblk, and the third and fourth holding circuits perform offset corrections of the third and fourth signal output circuits during the second horizontal blanking period Hblk. In the same manner for subsequent periods, offset corrections of two channels of output lines are performed every horizontal blanking period Hblk and therefore offset corrections of eight channels of output lines are completed with four horizontal blanking periods Hblk. In FIG. 10, since the number of channels of output lines to be subjected to the offset correction in one horizontal blanking period is less than that in the timing chart of FIG. 9, a longer offset correction duration is possible for one signal output circuit. This allows stable image signals to be obtained while suppressing power consumption. In the present embodiment, without limited to the timing charts of FIG. 9 and FIG. 10, the frequency and duration of offset corrections by the signal output circuits can be properly changed depending on a frame rate, power consumption, and/or capturing conditions. That is, N pairs (N is a natural number) of signal output circuit and holding circuit may be provided, and offset corrections for N/M pairs (M is a common divisor of N) of the signal output circuit and the holding circuit may be performed during a single horizontal blanking period Hblk. In this case, offset corrections for in total N pairs of the signal output circuit and the holding circuit are completed with M horizontal blanking periods Hblk. The value of M can be properly changed by the control circuit 6 depending on capturing conditions or the like.

In the solid state imaging device according to the present embodiment, multiple pairs of the signal output circuit and the holding circuit share a single correction circuit Afb. Even when the solid state imaging device has a plurality of output lines for achieving a faster readout operation of image signals, offset voltages of the plurality of signal output circuits can be eliminated or reduced. Further, even if the offset voltage occurs as a residue, respective offset voltages of the plurality of signal output circuits can be reduced to a significantly small voltage Δv of the correction circuit. This can eliminate variation in offset corrections for respective channels. Further, processing load of the post-stage image signal processor can be reduced and the dynamic range can be effectively utilized.

Sixth Embodiment

Figure 11:
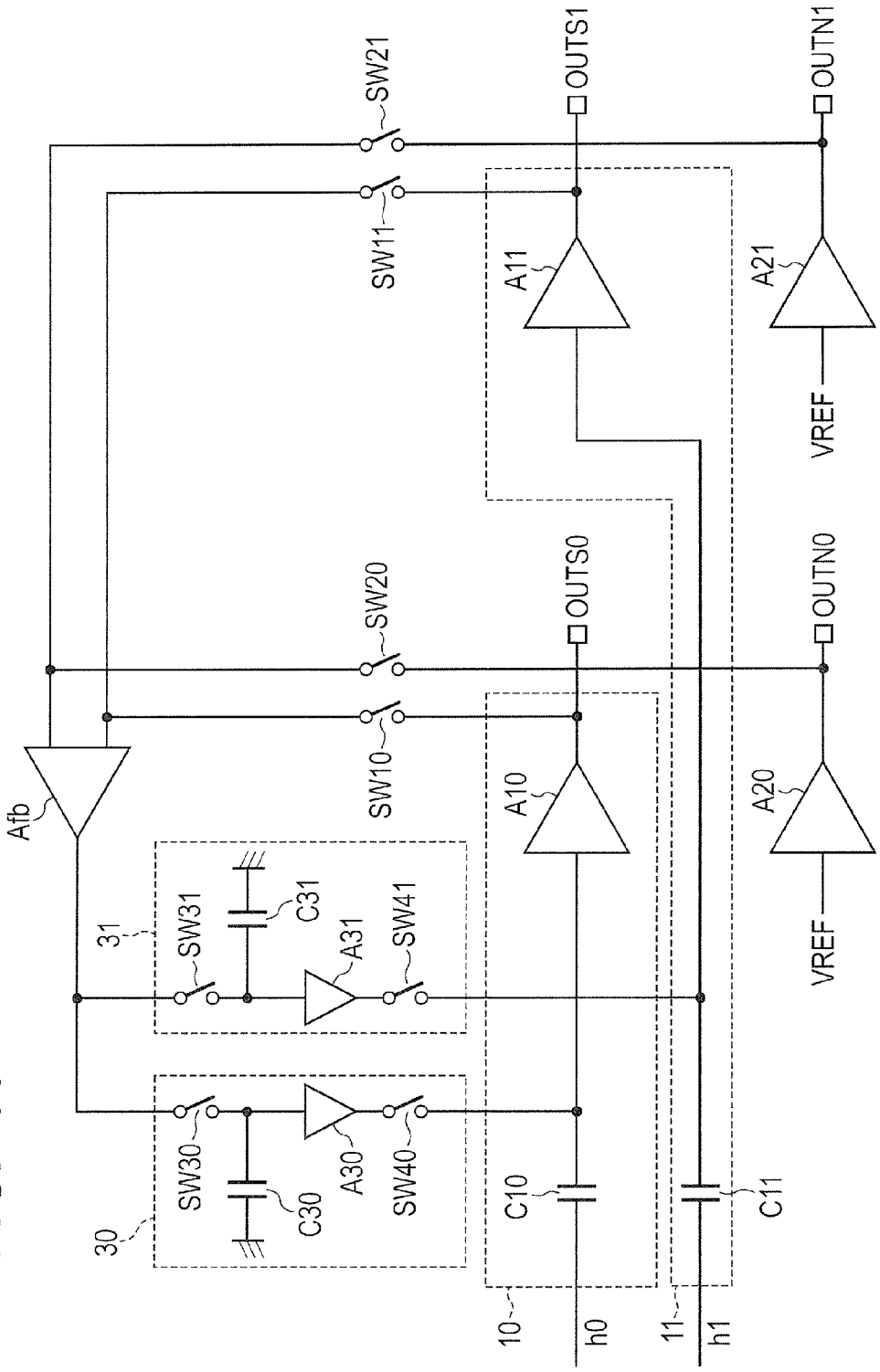
FIG. 11 is a block diagram of an output circuit according to a sixth embodiment of the present invention.

FIG. 11 is a block diagram of the output circuit 5 according to the sixth embodiment of the present invention. The output circuit 5 according to the present embodiment is different from that of the first embodiment in that it has multiple pairs of the signal output circuit and the holding circuit. In the following, features that are different from those in the first embodiment will be mainly described.

The signal output circuit 11 has the same configuration as the signal output circuit 10 and includes a clamp capacitor C11 and an amplifier A11. The holding circuit 31 has the same configuration as the holding circuit 30 and includes holding capacitor C31, the amplifier A31, and the switches SW31 and SW41. The signal from the amplifier A11 is output to the output terminal OUTS1, and the reference signal VREF is amplified by the amplifier A21 and output to the output terminal OUTN1. The correction circuit Afb can be selectively input with a differential voltage between the output terminals OUTS0 and OUTN0 or a differential voltage between the output terminals OUTS1 and OUTN1. A correction signal from the correction circuit Afb is output to the holding circuits 30 and 31. The holding circuits 30 and 31 apply correction signals to the input terminals of the amplifiers A10 and A11, respectively, to correct the levels of output signals of the amplifiers A10 and A11. In the present embodiment, the signal lines h0 and h1 are connected to the amplifiers A10 and A11 via the clamp capacitors C10 and C11, respectively, and the output circuit 5 can perform offset corrections while performing differential operations between the S signal and the N signal.

Figure 12:
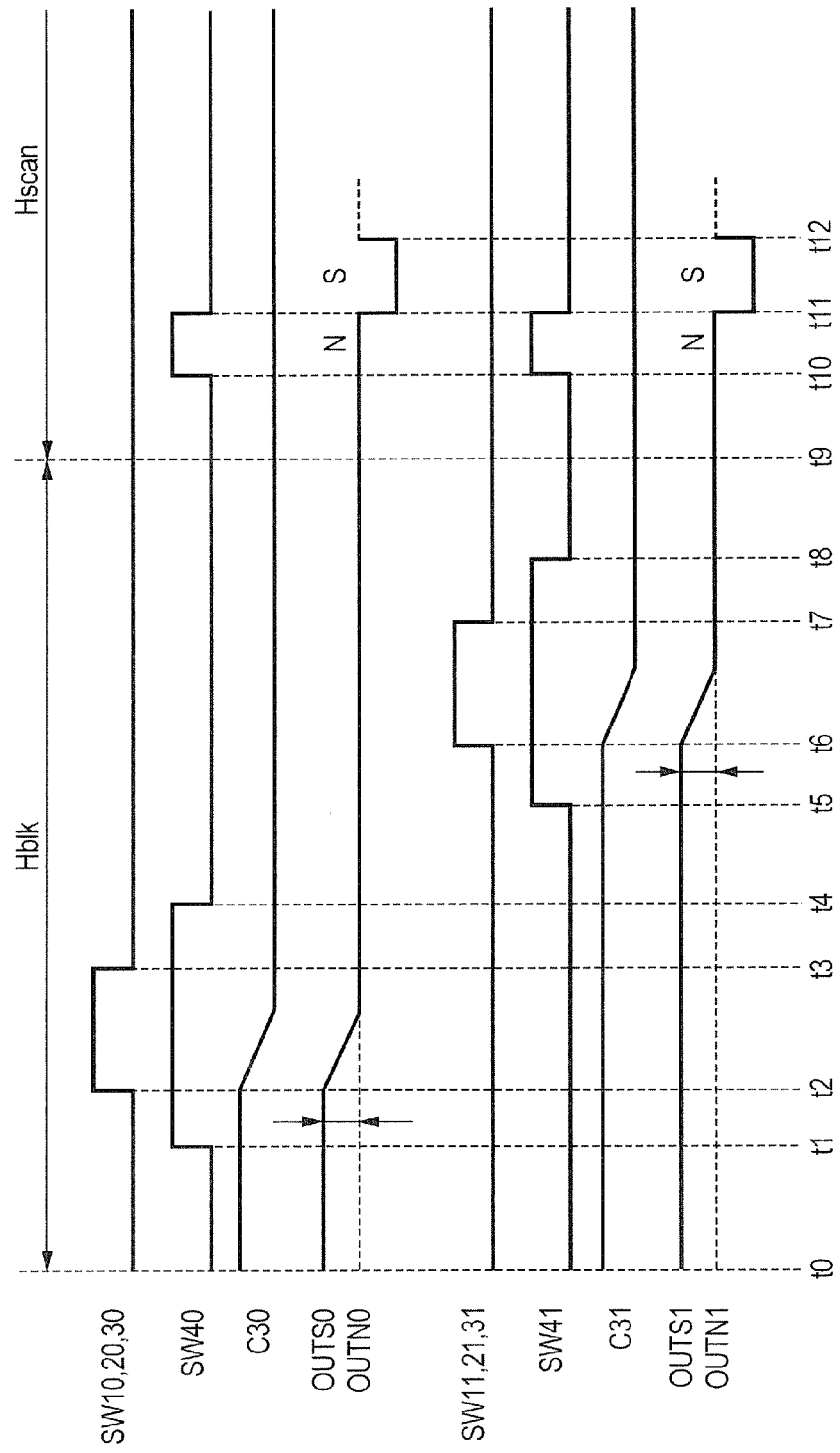
FIG. 12 is a timing chart of a solid state imaging device according to the sixth embodiment of the present invention.

FIG. 12 is a timing chart of the solid state imaging device according to the present embodiment. In the present embodiment, the output circuit 5 performs an offset correction of the amplifiers A10 and A20 and an offset correction of the amplifiers A11 and A21 during the horizontal blanking period Hblk (first correction) and holds respective correction signals in the holding circuits 30 and 31. The output circuit 5 then uses the correction signals held in the holding circuits 30 and 31 to sequentially output the N signals and the S signals from the output terminals OUTS0 and OUTS1 during the horizontal scanning period Hscan (second correction).

The timing chart of FIG. 12 will be described in detail below. Operation during time t0 to t4 is the same as that of the first embodiment. That is, the holding circuit 30 performs an offset correction by a feedback to the amplifier A10 of a correction signal that is based on the offset voltage between the output terminals OUTS0 and OUTN0. Then, the switch SW41 is turned on at time t5, and the switches SW11, SW21, and SW31 are turned on at time t6. The correction circuit Afb is input with a differential voltage between the output terminals OUTS1 and OUTN1 and outputs a correction signal based on the differential voltage to the holding circuit 31. The holding circuit 31 applies a correction signal from the amplifier A31 to the input terminal of the amplifier A11. Each of the offset voltages of the amplifiers A11 and A21 can be corrected by a feedback to the amplifier A11 of a correction signal that is based on a differential voltage between the output terminals OUTS1 and OUTN1. Then, at time t7, the switches SW11, SW21, and SW31 are turned off and the feedback loop is opened. Subsequently, at time t8, the switch SW41 is turned off. At this time, the holding capacitors C30 and C31 hold voltages as correction signals.

At time t9, the horizontal scanning period Hscan starts, and a signal based on charges at the time of resetting of the photoelectric conversion element PD is output to the signal lines h0 and h1. During time t10 to t11, the switches SW40 and SW41 are turned on, and the holding circuits 30 and 31 apply correction signals held during the horizontal blanking period Hblk to the input terminals of the amplifiers A10 and A11 to clamp the voltage of the N signal to the voltage of the correction signal.

Next, the readout circuit 3 reads out the S signals that are based on charges at the time of a photoelectric conversion and outputs them to the signal lines h0 and h1. At time t11, the switches SW40 and SW41 are turned off and therefore the input terminals of the amplifiers A10 and A11 are electrically disconnected from the holding circuits 30 and 31. In response to input of the S signals to the input terminals of the amplifiers A10 and A11 via the clamp capacitors C10 and C11, the voltages of the input terminals change by a voltage difference between the S signals and the N signals. That is, (S−N) signals resulted by subtracting the N signals from the S signals are input to the input terminals of the amplifiers A10 and A11. Thereby, a noise component due to characteristics variation among elements of the pixel unit 1 and the readout circuit 3 can be removed from the S signals and therefore pixel signals with no fixed pattern noise can be differentially output from the output terminals OUTS and OUTN.

In a similar manner to the second embodiment, the present embodiment also allows for removal of a noise component and for correction of the offset voltages of the output circuit while achieving a faster readout operation of pixel signals. The present embodiment here intends to output signals to differential amplifiers in the signal processing circuit, and therefore voltages based on the reference signal VREF are output to the output terminals OUTN0 and OUTN1 from the amplifiers A20 and A21. However, the reference signal VREF may be directly output to the output terminals OUTN0 and OUTN1 without using the amplifiers A20 and A21. The offset voltage of the amplifiers A10 and A11 can be corrected by providing only the amplifiers A10 and A11 to the output terminals OUTS0 and OUTS1, and the input voltage range of the signal processing circuit can be effectively utilized. Furthermore, a shared amplifier may be provided in a plurality of signal output circuits, and a reference signal may be output from this shared amplifier to respective output terminals OUTN0 and OUTN1. In the present embodiment, variation in offset corrections among multiple output lines can be eliminated, which has been described above. Further, a signal from any one of the invalid pixels of the invalid pixel area illustrated in FIG. 4A and FIG. 4B may be used to perform offset corrections of the plurality of signal output circuits. Furthermore, invalid pixels may be provided on the same number of columns as the number of the signal output circuits to perform an offset correction based on a signal from an invalid pixel corresponding to the signal output circuit.

In the present embodiment, in a similar manner to the embodiments described above, it is possible to correct offset voltages of amplifiers which would otherwise cause degradation of image signals when pixel signals from the solid state imaging device are output from the amplifiers. This allows for reduction in processing load of an image signal processor that receives outputs from the solid state imaging device.

Seventh Embodiment

Figure 13:
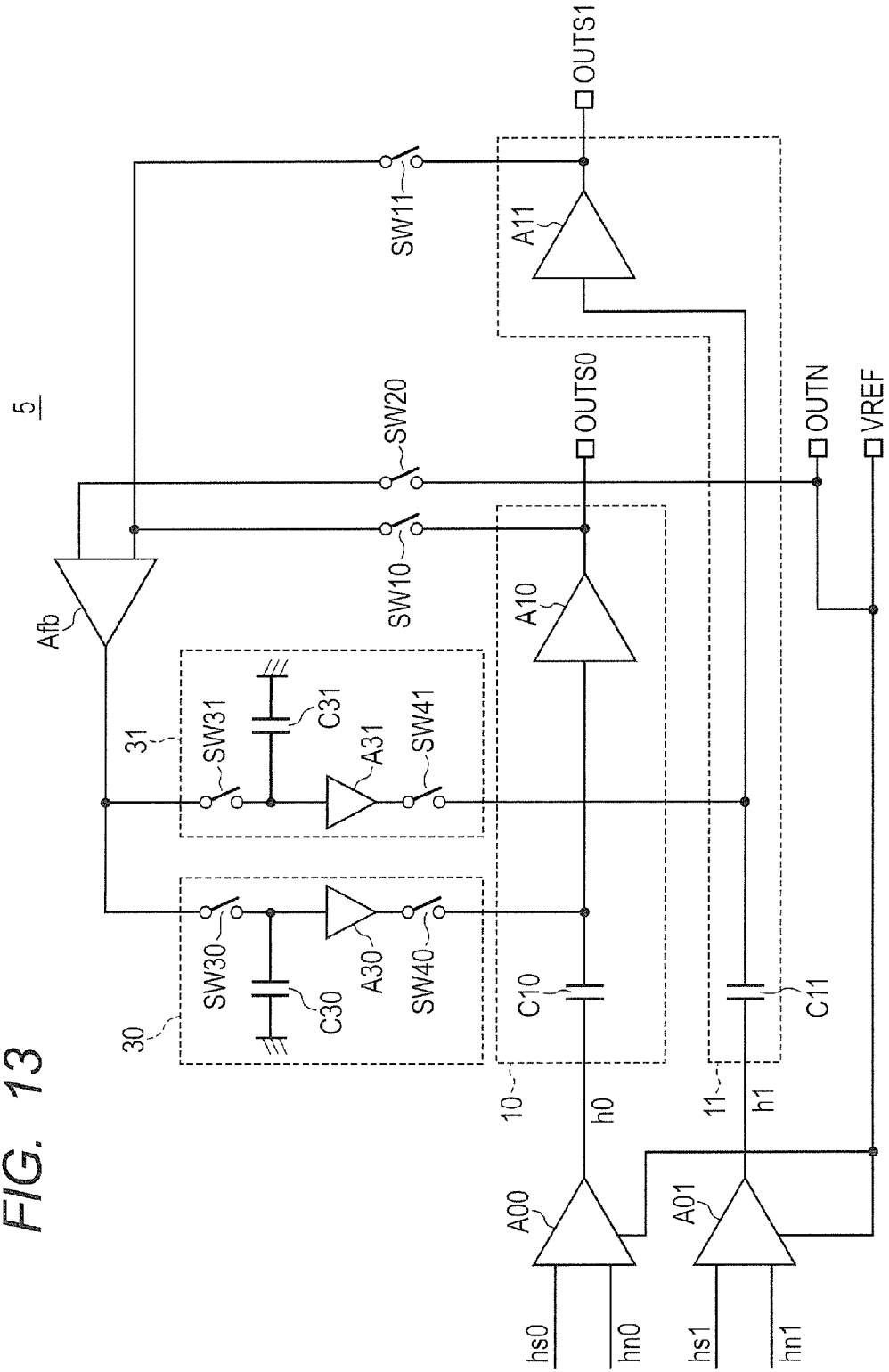
FIG. 13 is a block diagram of an output circuit according to a seventh embodiment of the present invention.

FIG. 13 is a block diagram of the output circuit 5 according to the present embodiment. In the following, features that are different from those in the sixth embodiment will be mainly described. The output circuit 5 further includes amplifiers A00 and A01. One of the input terminals of the amplifier A00 is connected to a signal line hs0, and the other input terminal is connected to a signal line hn0. The output terminal of the amplifier A00 is connected to the input terminal of the amplifier A10 via the clamp capacitor C10. Therefore, a signal based on a voltage difference between the signal lines hs0 and hn0 is output to the signal line h0. Further, one of the input terminals of the amplifier A01 is connected to a signal line hs1, and the other input terminal is connected to a signal line hn1. The output terminal of the amplifier A01 is connected to the input terminal of the amplifier A11 via the clamp capacitor C11. The reference signal VREF is output from the output terminal OUTN without going through an amplifier, and the output terminal OUTN outputs the reference signal VREF common to the output terminals OUTS0 and OUTS1. Further, the reference signal VREF of the output terminal OUTN is input to the correction circuit Afb, and two correction signals based on the reference signal VREF are output from the correction circuit Afb.

The present embodiment allows for various advantages as follows compared to the sixth embodiment. Although the N signal and the S signal are sequentially output to the signal lines h0 and h1 in the sixth embodiment, the N signal is output to the signal lines hn0 and hn1 and the S signal is output to the signal lines hs0 and hs1 simultaneously in the present embodiment. Each of the amplifiers A00 and A01 outputs a differential voltage between the N signal and the S signal and thereby a pixel signal in which a noise component has been removed can be obtained. Further, simultaneous output of the N signal and the S signal allows for a lower driving frequency of the signal lines. Clamp operations by the clamp capacitors C10 and C11 can be implemented with a unit of multiple pixels rather than a unit of a single pixel. Furthermore, offset voltages of the amplifiers A00 and A01 can be removed by the clamp capacitors C10 and C11. Note that signals of optical black (OB) pixels may be used to perform clamp operation.

In the readout circuit 3, high quality pixel signals can be obtained without directly driving signal lines by using a buffer or a gain amplifier. Further, also in the present embodiment, the offset voltage of the output terminals OUTN and OUTS0 and the offset voltage of the output terminals OUTN and OUTS1 can be corrected by using a correction signal from a shared correction circuit Afb in a similar manner to the sixth embodiment. Therefore, variation of the offset corrections among different output lines can be reduced.

Eighth Embodiment

The imaging device described in each of the above embodiments is applicable to various imaging systems. An example of the imaging system may be a digital still camera, a digital camcorder, a surveillance camera, and the like. FIG. 14 illustrates an imaging system where an imaging device of any of the embodiments described above is applied to a digital still camera as an example of the imaging system.

The imaging system exemplified in FIG. 14 has an imaging device 301, a barrier 303 for protection of a lens 302, the lens 302 for capturing an optical image of a subject on the imaging device 301, and a diaphragm 304 for changing a light amount passing through the lens 302. The lens 302 and the diaphragm 304 form an optical system for converging a light onto the imaging device 301. The imaging device 301 is an imaging device of any of the embodiments described above. Further, the imaging system exemplified in FIG. 14 has an output signal processor 305 that processes output signals output from the imaging device 301. The output signal processor 305 generates an image based on signals output by the imaging device 301. Specifically, the output signal processor 305 performs various corrections and compressions, if necessary, to output image data. Further, the output signal processor 305 uses a signal output by the imaging device 301 to perform a focus detection.

Furthermore, the imaging system has a buffer memory 306 for temporarily recording image data and an external interface (external I/F) 308 for communicating with an external computer or the like. Furthermore, the imaging system has a recording medium 309 such as a semiconductor memory for performing recording or readout of captured data and a recording medium control interface (recording medium control I/F) 307 for performing recording or readout to the recording medium 309. Note that the recording medium 309 may be incorporated in the imaging system or may be removable.

Furthermore, the imaging system has a general control/operation unit 310 that control various operations and the entire digital still camera and a timing generator 311 that outputs various timing signals to the imaging device 301 and the output signal processor 305. In this example, timing signals or the like may be input externally, and the imaging system may have at least the imaging device 301 and the output signal processor 305 that processes output signals output from the imaging device 301.

As described above, the imaging system of the present embodiment is able to perform capturing operation with application of the imaging device 301.

Other Embodiments

The embodiments described above each are a mere example for embodying the present invention when implementing the same, the technical scope of the present invention should not be construed in a limiting sense by these examples. That is, the present invention can be implemented in various forms without departing from the technical concept thereof or the primary features thereof. For example, an amplifier may be of a single input type or a differential input type as long as it provides a similar function.

Embodiments of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer-executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-171759, filed Sep. 1, 2015, which is hereby incorporated by reference herein in its entirety.

What is claimed is:

1. A solid state imaging device comprising:
   a pixel unit including a plurality of pixels arranged in a matrix, wherein each of the pixels includes a photoelectric conversion element;
   a signal line;
   a readout circuit that outputs, to the signal line, a first signal corresponding to a state where the pixel is reset and a second signal based on charges generated by photoelectric conversion in the photoelectric conversion element;
   a signal output circuit including an amplifier and a clamp capacitor, wherein a first terminal of the clamp capacitor is connected to the signal line and a second terminal of the clamp capacitor is connected to an input terminal of the amplifier;
   a correction circuit that generates a correction signal based on a difference between an output signal of the amplifier and a reference signal; and
   a holding circuit that holds the correction signal and applies the correction signal to the input terminal of the amplifier when the first signal is output to the signal line.

2. The solid state imaging device according to claim 1 comprising a plurality of pairs of the signal output circuit and the holding circuit,
   wherein the correction circuit applies the correction signal to the input terminal of the amplifier in a selected pair of the plurality of pairs of the signal output circuit and the holding circuit.

3. The solid state imaging device according to claim 1 further comprising a second amplifier that outputs the reference signal.

4. The solid state imaging device according to claim 3 the second amplifier is shared by a plurality of the signal output circuits.

5. The solid state imaging device according to claim 1 further comprising an output terminal connected to the signal output circuit.

6. The solid state imaging device according to claim 1, wherein the reference signal is a fixed voltage that does not depend on a signal from the photoelectric conversion element.

7. The solid state imaging device according to claim 1,
   wherein the signal output circuit, the correction circuit, and the holding circuit form a part of a feedback loop, and
   wherein the holding circuit performs a first correction for correcting a level of the output signal with the feedback loop closed based on the correction signal and performs a second correction for correcting a level of the output signal with the feedback loop opened based on the correction signal held at the first correction.

8. The solid state imaging device according to claim 7, wherein the holding circuit performs the first correction during a horizontal blanking period and performs the second correction during a horizontal scanning period.

9. The solid state imaging device according to claim 8,
   wherein the pixel unit includes a light shielded pixel row, and
   wherein the holding circuit performs the first correction during a horizontal blanking period of the light shielded pixel row.

10. The solid state imaging device according to claim 8,
    wherein the pixel unit includes an invalid pixel area, and
    wherein the holding circuit performs the first correction based on a signal from any one of invalid pixels of the invalid pixel area during a horizontal blanking period.

11. The solid state imaging device according to claim 10,
    wherein the invalid pixel area includes at least the same number of the invalid pixels as the number of the signal output circuits, and
    wherein the holding circuit performs the first correction based on a signal from the invalid pixel corresponding to the signal output circuit.

12. The solid state imaging device according to claim 7 comprising N pairs of the signal output circuit and the holding circuit, where N is a natural number,
wherein the first correction is performed by N/M pairs of the signal output circuit and the holding circuit during one horizontal blanking period, where M is a common divisor of N, and the first correction is performed in N pairs of the signal output circuit and the holding circuit during M horizontal blanking periods.

13. The solid state imaging device according to claim 12 further comprising a control circuit that changes a value of the M.

14. The solid state imaging device according to claim 1, wherein the holding circuit comprises a holding capacitor that holds the correction signal.

15. The solid state imaging device according to claim 1, wherein the holding circuit comprises a single-input amplifier.

16. The solid state imaging device according to claim 1, wherein the holding circuit has an A/D convertor that converts the correction signal into a digital signal, a memory that holds the digital signal, a D/A convertor that outputs the held digital signal to the signal output circuit as an analog correction signal.

17. An imaging system comprising:
a solid state imaging device comprising
a pixel unit including a plurality of pixels arranged in a matrix, wherein each of the pixels includes a photoelectric conversion element;
a signal line;
a readout circuit that outputs, to the signal line, a first signal corresponding to a state where the pixel is reset and a second signal based on charges generated by photoelectric conversion by the photoelectric conversion element;
a signal output circuit including an amplifier and a clamp capacitor, wherein a first terminal of the clamp capacitor is connected to the signal line and a second terminal of the clamp capacitor is connected to an input terminal of the amplifier;
a correction circuit that generates a correction signal based on a difference between an output signal of the amplifier and a reference signal; and
a holding circuit that holds the correction signal and applies the correction signal to the input terminal of the amplifier when the first signal is output to the signal line; and
a signal processor that processes a signal output by the solid state imaging device.

18. A solid state imaging device comprising:
a pixel unit including a plurality of pixels arranged in a matrix, wherein each of the pixels includes a photoelectric conversion element;
a plurality of signal lines;
a readout circuit that outputs a signal from the pixel to the plurality of signal lines;
a plurality of signal output circuits each has an amplifier connected to corresponding one of the plurality of signal lines and configured to amplify a signal from the pixel;
a correction circuit provided common to the plurality of signal output circuits so as to each generate a plurality of correction signals based on a difference between a reference signal and an output signal of the amplifier of one of the plurality of signal output circuits; and
a plurality of holding circuits provided associated with the plurality of signal output circuits, each of the plurality of holding circuits configured to hold the correction signal and apply the correction signal to the input terminal of the associated amplifier.

19. The solid state imaging device according to claim 18 further comprising a second amplifier that outputs the reference signal,
wherein the second amplifier is shared by the plurality of signal output circuits.

20. The solid state imaging device according to claim 18, wherein the plurality of signal output circuits, the correction circuit, and the plurality of holding circuits form a part of a feedback loop, and
wherein each of the holding circuits performs a first correction for correcting a level of the output signal with the feedback loop closed based on the correction signal and a second correction for correcting a level of the output signal with the feedback loop opened based on the correction signal held at the first correction.

* * * * *